United States Patent
Su et al.

(10) Patent No.: US 11,420,517 B2
(45) Date of Patent: Aug. 23, 2022

(54) BRAKE PEDAL SLEEVE WITH THROTTLE PROTECTION FUNCTION AND INSTALLATION METHOD FOR FACILITATING INSTALLATION

(71) Applicants: Chongqing industry Polytechnic College, Chongqing (CN); Chongqing Zhire Technology Development Company, Chongqing (CN)

(72) Inventors: Tao Su, Chongqing (CN); Bingyan Luo, Chongqing (CN); Jingyun Ouyang, Chongqing (CN); Dong Chen, Chongqing (CN); Yuan Ge, Chongqing (CN); Xiaoyi Gui, Chongqing (CN); Gang Ouyang, Chongqing (CN)

(73) Assignee: CHONGQING INDUSTRY POLYTECHNIC COLLEGE, Chongqing (CN)

( * ) Notice: Subject to any disclaimer, the term of this patent is extended or adjusted under 35 U.S.C. 154(b) by 4 days.

(21) Appl. No.: 16/478,487

(22) PCT Filed: Dec. 18, 2018

(86) PCT No.: PCT/CN2018/121685
§ 371 (c)(1),
(2) Date: Jul. 17, 2019

(87) PCT Pub. No.: WO2019/153895
PCT Pub. Date: Aug. 15, 2019

(65) Prior Publication Data
US 2021/0362595 A1 Nov. 25, 2021

(30) Foreign Application Priority Data
Feb. 7, 2018 (CN) .......................... 201810124713.7

(51) Int. Cl.
*B60K 28/10* (2006.01)
*B60T 7/06* (2006.01)
*G05G 1/483* (2008.04)

(52) U.S. Cl.
CPC ............. *B60K 28/10* (2013.01); *B60T 7/06* (2013.01); *G05G 1/483* (2013.01)

(58) Field of Classification Search
CPC .......... G05G 1/483; G05G 1/487; G05G 1/48; B60T 7/06; B60K 28/10
See application file for complete search history.

(56) References Cited

U.S. PATENT DOCUMENTS

| | | | | |
|---|---|---|---|---|
| 1,297,202 A | * | 3/1919 | McGiehan | G05G 1/483 74/563 |
| 1,302,837 A | * | 5/1919 | Norris | G05G 1/487 74/563 |

(Continued)

FOREIGN PATENT DOCUMENTS

| CN | 105216771 A | * | 1/2016 |
|---|---|---|---|
| CN | 205022563 U | | 2/2016 |

(Continued)

*Primary Examiner* — Daniel D Yabut
(74) *Attorney, Agent, or Firm* — Gang Yu

(57) ABSTRACT

A brake pedal sleeve with a throttle protection function and for facilitating installation of the throttle protection, including a main bracket plate, an auxiliary baffle plate, a protection rod, an anti-slip rubber pad, a brake pedal and an adjusting screw; wherein a supporting head, a square hook strip, a main baffle plate and the anti-slip rubber pad are provided on the main bracket plate; the protection rod is provided with a connecting rod, a limiting ring and a limiting screw, one end of the protection rod supporting shaft is provided with a circular head, and the protection rod supporting shaft passes through a washer, a protection rod through hole, a supporting head through hole and an inner hole of the spring ring, and the main bracket plate and the (Continued)

protection rod are combined together; the installation of the present disclosure is more convenient, quick and more stable.

7 Claims, 6 Drawing Sheets

(56) References Cited

U.S. PATENT DOCUMENTS

| | | | | |
|---|---|---|---|---|
| 1,346,361 A | * | 7/1920 | Williams | G05G 1/487 |
| | | | | 74/562 |
| 1,388,935 A | * | 8/1921 | De Tamble | G05G 1/487 |
| | | | | 74/563 |
| 1,449,990 A | * | 3/1923 | Grund | G05G 1/487 |
| | | | | 74/563 |
| 1,455,675 A | * | 5/1923 | Sinclair | G05G 1/483 |
| | | | | 74/563 |
| 2,759,370 A | * | 8/1956 | Frates | G05G 1/487 |
| | | | | 74/562 |
| 2,809,538 A | * | 10/1957 | Caldwell | G05G 1/483 |
| | | | | 74/563 |

FOREIGN PATENT DOCUMENTS

| | | | | |
|---|---|---|---|---|
| CN | 206031360 U | | 3/2017 | |
| CN | 106627527 A | * | 5/2017 | |
| CN | 106740757 A | * | 5/2017 | |
| CN | 107054318 A | * | 8/2017 | |
| CN | 206552014 U | | 10/2017 | |
| CN | 107444367 A | | 12/2017 | |
| CN | 107472218 A | * | 12/2017 | |
| CN | 107472219 A | * | 12/2017 | |
| CN | 108297848 A | | 7/2018 | |
| CN | 207931697 U | | 10/2018 | |
| DE | 3812374 A1 | * | 11/1988 | G05G 1/60 |
| JP | 4974039 B1 | | 7/2012 | |
| WO | WO-2012131766 A1 | * | 10/2012 | G05G 1/30 |

* cited by examiner

BRAKE PEDAL SLEEVE WITH THROTTLE PROTECTION FUNCTION AND INSTALLATION METHOD FOR FACILITATING INSTALLATION

TECHNICAL FIELD

The present disclosure relates to an automobile driving safety apparatus, and in particular, to a brake pedal sleeve with a throttle protection function and for facilitating installation of the throttle protection.

BACKGROUND

In order to prevent a throttle from being used as a brake, there are studies both at home and abroad. There are used a radar obstacle detection apparatus: warning or cutting off an oil path when an obstacle is present in a vehicle close distance; However, the radar obstacle detection apparatus influences the normal traveling of the vehicle in a place where the road is narrow and the vehicle is dense; With the method of throttle pedal delay response, the driver may be given the time and chance of interrupting the error instruction, but the function is not suitable for the near-distance encountered person without self-correction capability; There is also a passive safety system study that performs error correction on the error behavior of the throttle vehicle which has occurred by the driver, and although such a design has a certain terminating effect, the driver determines that the data source has excessively stepped on the refueling pedal. When the vehicle is slipping, a high-speed overtaking and a steep sudden refueling are encountered, particularly in an emergency situation such as a road condition abnormality, the speed at which the driver depresses the throttle valve may also be very fast, and a judgment error may be caused once the program discriminates from each other, and the consequently would not be conceivable. The inventors have designed a safety apparatus which is simple in structure and safe and reliable and is mounted on a brake pedal, however, the installation methods of these apparatuses are not ideal enough, the user experience is poor, and the promotion of the apparatus is affected.

SUMMARY

In view of the disadvantages in the prior art, the present disclosure provides a brake pedal sleeve with throttle protection function for facilitating installation.

The technical solutions adopted by some embodiments of the present disclosure are as follows: a brake pedal sleeve with throttle protection function for facilitating installation, including a main bracket plate, an auxiliary baffle plate, a protection rod, an anti-slip rubber pad, a brake pedal and an adjusting screw; wherein a supporting head, a square hook strip, a main baffle plate and the anti-slip rubber pad are provided on the main bracket plate; a supporting head through hole is provided on the supporting head, a square hook strip threaded hole is provided below the square hook strip, a main baffle plate threaded hole is provided on the main baffle plate, and a main baffle plate tooth is provided inside the main baffle plate; a small circular shaft sliding hole and a large circular shaft sliding hole are further provided in the main bracket plate; a small circular shaft and a large circular shaft are provided on the auxiliary baffle plate, an auxiliary baffle plate tooth is provided on an inner side of the auxiliary baffle plate, and an auxiliary baffle plate through hole is provided on the auxiliary baffle plate; a connecting rod, a limiting ring and a limiting screw are provided on the protection rod, and a circular head is provided at one end of a protection rod supporting shaft, the protection rod supporting shaft passes through a washer, a protection rod through hole, a supporting head through hole and an inner hole of the spring ring, and the main bracket plate and the protection rod are combined together; a front end of the adjusting screw is a tapered head, and under an absence of an external force, an elastic force of the spring ring always flips the protection rod to the right side and makes the protection rod opening in a horizontal state; the small circular shaft and the large circular shaft on the auxiliary baffle plate tooth is able to be respectively inserted into the small circular shaft sliding hole and the large circular shaft sliding hole; a long bolt is able to be screwed into the main baffle plate threaded hole through the auxiliary baffle plate through hole for clamping the brake pedal sheathed with a glue sleeve from the left and right; the adjusting screw is rotated into the square hook strip threaded hole for fixing the brake pedal sheathed with the glue sleeve from below.

In an exemplary embodiment, the small circular shaft and the small circular shaft sliding hole are clearance-fitted; the large circular shaft and the large circular shaft sliding hole are clearance-fitted; the protection rod supporting shaft and the washer are clearance-fitted, the protection rod supporting shaft and the protection rod through hole are clearance-fitted, and the protection rod supporting shaft and the supporting head through hole are interference fit; a front end of the limiting screw screws out of the protection rod, which can block the protection rod from continuing to rotate upward or downward near the main bracket plate.

The technical solution of the present disclosure has the following beneficial effects:

1) The present disclosure is able to be used directly on a brake pedal of an original vehicle without retrofitting any components of the vehicle;

2) The present disclosure adopts the left and right and upper and lower clamping manner for fixing, the installation is more convenient and quick, and is more stable;

3) The present disclosure is suitable for various different shapes of vehicle models, different sizes of brake pedal installation, and generally users is able to be installed on their own;

4) The components of the present disclosure are small and suitable for industrial casting, and therefore have a wider adaptability, which is beneficial to the promotion of applications of security devices.

In the figures: 10—main bracket plate, 11—supporting head, 12—supporting head through hole, 13—square hook strip, 14—square hook strip threaded hole, 15—small circular shaft sliding hole, 16—large circular shaft sliding hole, 17—main baffle plate, 18—main baffle plate threaded hole, 19—main baffle plate threaded hole, 20—auxiliary baffle plate, 21—auxiliary baffle plate tooth, 22—small circular shaft, 23—large circular shaft, 24—auxiliary baffle plate through hole, 25—long bolt, 30—protection rod, 31—connecting rod, 32—limiting ring, 33—protection rod supporting shaft, 34—circular head, 35—spring ring, 36—limiting screw, 37—washer, 38—protection rod through hole, 40—anti-slip rubber pad, 50—brake pedal, 51—glue sleeve, 52—brake pedal supporting rod, 60—adjusting screw, 61—tapered head.

DETAILED DESCRIPTION OF THE EMBODIMENTS

Figure 1:
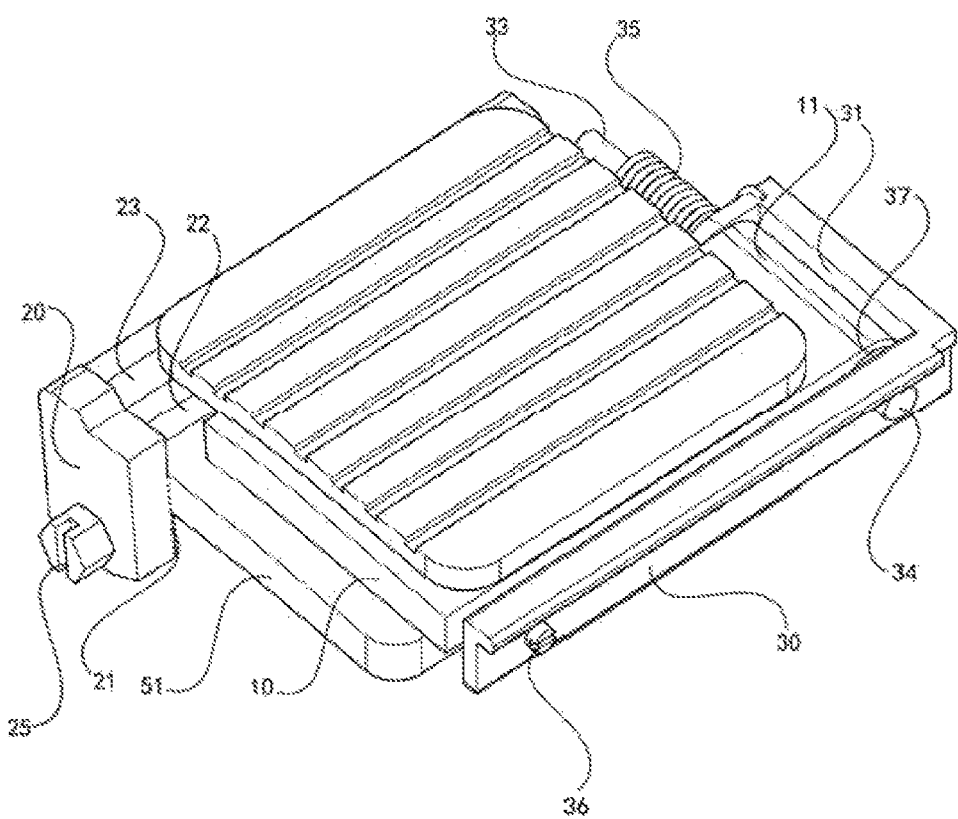
FIG. 1 is a front side perspective view of the present disclosure (in a state in which a protection rod mounted on a brake pedal is closed)
Figure 2:
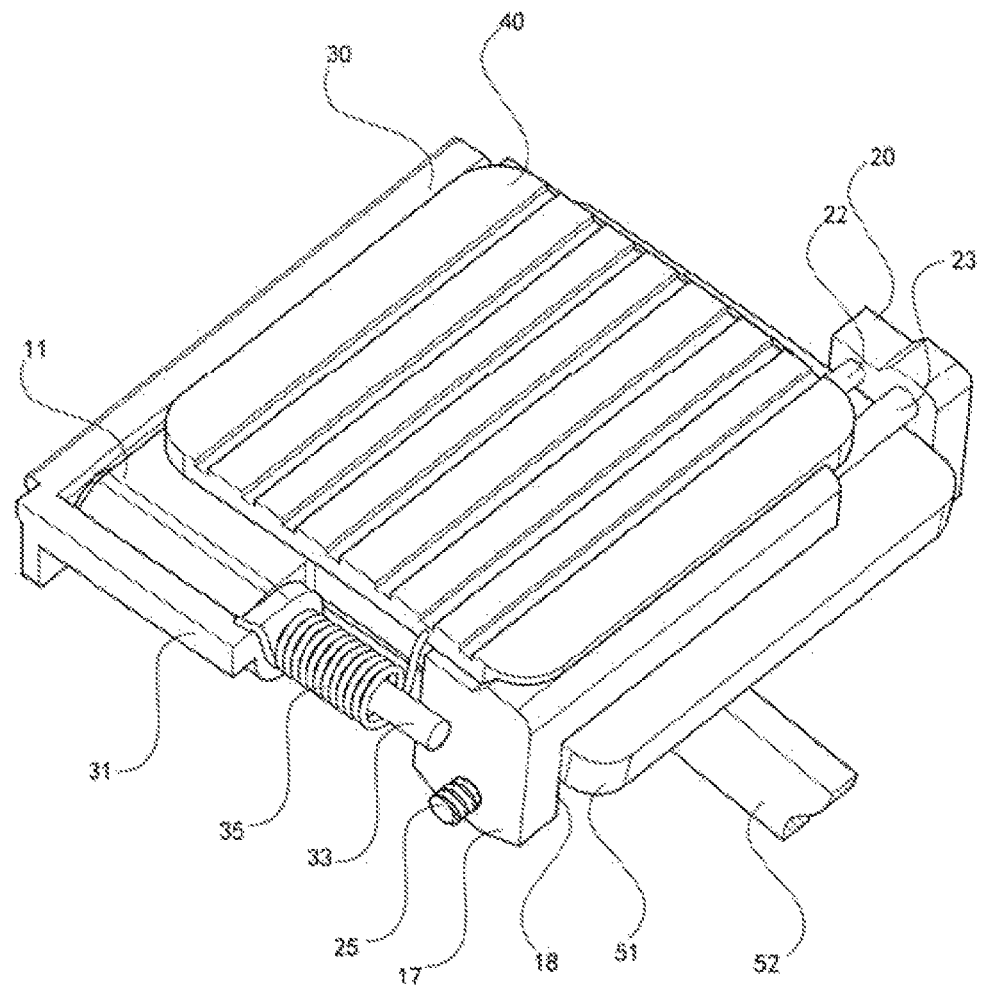
FIG. 2 is a rear side perspective view of the present disclosure (in a state in which a protection rod mounted on a brake pedal is closed)
Figure 3:
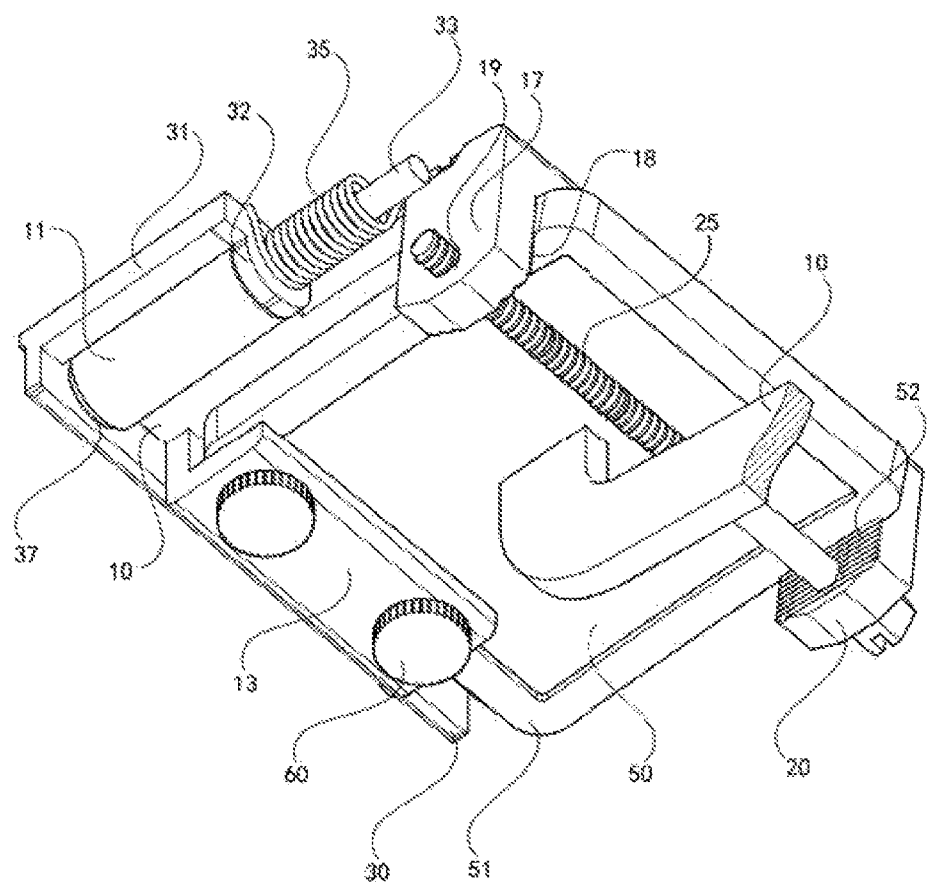
FIG. 3 is a side view of a rear side bottom surface of the present disclosure (in a state in which a protection rod mounted on a brake pedal is closed)
Figure 4:
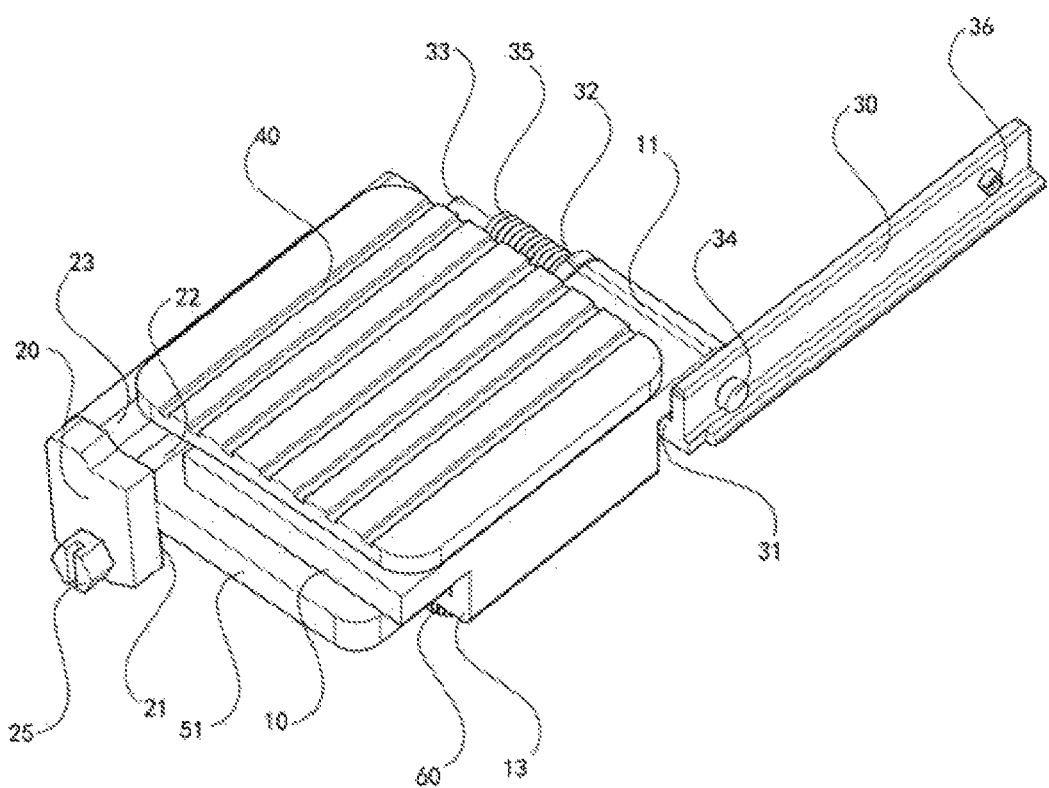
FIG. 4 is a front side perspective view of the present disclosure (in a state in which a protection rod mounted on a brake pedal is opened)
Figure 5:
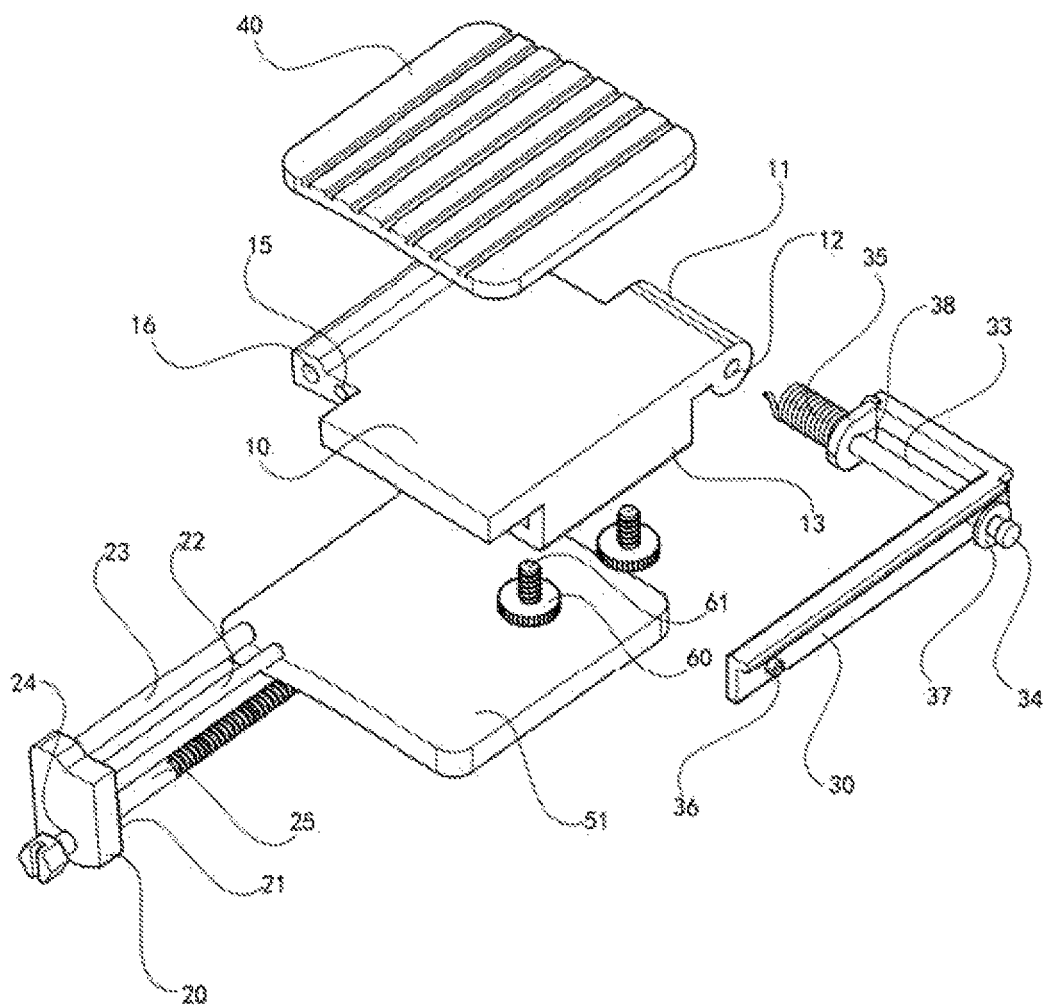
FIG. 5 is a schematic structural view of the present disclosure; (Overhead side view)
Figure 6:
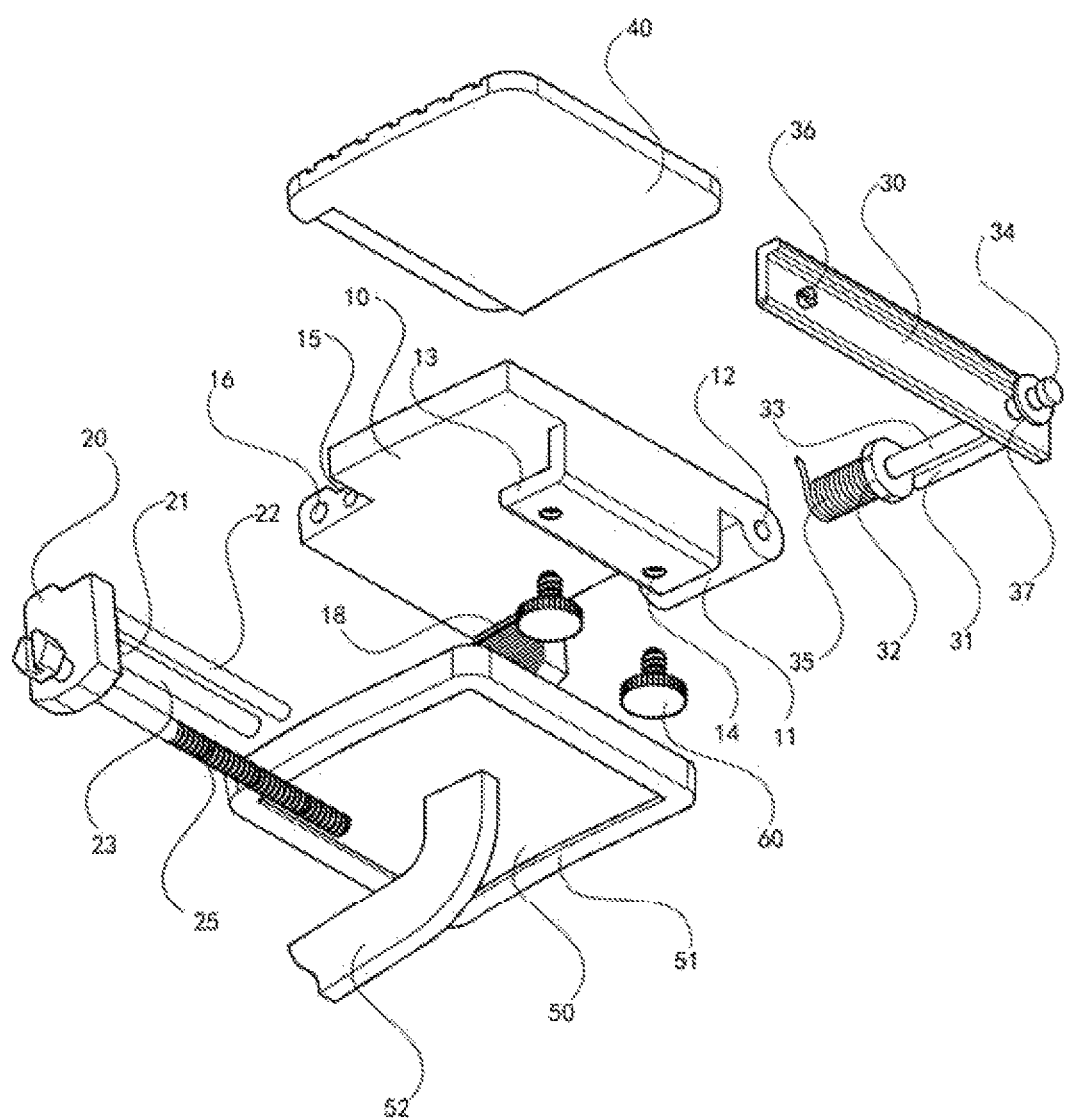
FIG. 6 is a structural schematic diagram of the present disclosure; (Bottom side view)

Hereinafter, the present disclosure will be further described with reference to the accompanying drawings. As shown in FIGS. 1 to 6, a brake pedal sleeve with throttle protection function for facilitating installation, includes a main bracket plate 10, an auxiliary baffle plate 20, a protection rod 30, an anti-slip rubber pad 40, a brake pedal 50 and an adjusting screw 60; wherein a supporting head 11, a square hook strip 13, a main baffle plate 17 and the anti-slip rubber pad 40 are provided on the main bracket plate 10; a supporting head through hole 12 is provided on the supporting head 11, a square hook strip threaded hole 14 is provided below the square hook strip 13, a main baffle plate threaded hole 19 is provided on the main baffle plate 17, and a main baffle plate tooth 18 is provided inside the main baffle plate 17; a small circular shaft sliding hole 15 and a large circular shaft sliding hole 16 are further provided in the main bracket plate 10; a small circular shaft 22 and a large circular shaft 23 are provided on the auxiliary baffle plate 20, an auxiliary baffle plate tooth 21 is provided on an inner side of the auxiliary baffle plate 20, and an auxiliary baffle plate through hole 24 is provided on the auxiliary baffle plate 20; a connecting rod 31, a limiting ring 32 and a limiting screw 36 are provided on the protection rod 30, and a circular head 34 is provided at one end of a protection rod supporting shaft 33, the protection rod supporting shaft 33 passes through a washer 37, a protection rod through hole 38, a supporting head through hole 12 and an inner hole of the spring ring 35, and the main bracket plate 10 and the protection rod 30 are combined together; a front end of the adjusting screw 60 is a tapered head 61, and under an absence of an external force, an elastic force of the spring ring 35 always flips the protection rod 30 to the right side and makes the protection rod 30 opening in a horizontal state; the small circular shaft 22 and the large circular shaft 23 on the auxiliary baffle plate tooth 21 is able to be respectively inserted into the small circular shaft sliding hole 15 and the large circular shaft sliding hole 16; a long bolt 25 is able to be screwed into the main baffle plate threaded hole 19 through the auxiliary baffle plate through hole 24 for clamping the brake pedal 50 sheathed with a glue sleeve 51 from the left and right; the adjusting screw 60 is rotated into the square hook strip threaded hole 14 for fixing the brake pedal 50 sheathed with the glue sleeve 51 from below.

the small circular shaft 22 and the small circular shaft sliding hole 15 are clearance-fitted; the large circular shaft 23 and the large circular shaft sliding hole 16 are clearance-fitted; the protection rod supporting shaft 33 and the washer 37 are clearance-fitted, the protection rod supporting shaft 33 and the protection rod through hole 38 are clearance-fitted, and the protection rod supporting shaft 33 and the supporting head through hole 12 are interference fit; a front end of the limiting screw 36 screws out of the protection rod 30, which can block the protection rod 30 from continuing to rotate upward or downward near the main bracket plate 10.

An installing method for a preventive throttle misstep device clamped on a brake pedal includes the following steps:

1) exiting the adjusting screw 60 on the square hook strip 13 from the square hook strip threaded hole 14;

2) screwing out the long bolt 25 from the main baffle plate screw hole 19, and taking out the small circular shaft 22 and the large circular shaft 23 from the small circular shaft sliding hole 15 and the large circular shaft sliding hole 16 respectively;

3) gripping the main bracket plate 10 behind the brake pedal support rod 52, and placing the square hook strip 13 below the brake pedal 50 sheathed with the glue sleeve 51;

4) loading rear under part of the brake pedal 50 sheathed with the glue sleeve 51 into an inner groove of the square hook strip 13;

5) pressing a bottom surface of the main bracket plate 10 on a top surface of the glue sleeve 51, and loading the small circular shaft 22 and the large circular shaft 23 into the small circular shaft sliding hole 15 and the large circular shaft sliding hole 16 respectively;

6) passing the long bolt 25 through the auxiliary baffle plate through hole 24 and screwing into the main baffle plate screw hole 19, adjusting a position of the main board 10, so that the protection rod 30 is opened and parallel to a bottom edge of the brake pedal 50;

7) flipping the protection rod 30, confirming that the glue sleeve 51 on the brake pedal 50 does not block an opening and closing of the protection rod 30;

8) fastening the long bolt 25 through the auxiliary baffle plate through hole 24 and into the main baffle plate threaded hole 19, so that the main baffle plate tooth 18 on the main baffle plate 17 and the auxiliary baffle plate tooth 21 on the auxiliary baffle plate 20 firmly grip the brake pedal 50 sheathed with the glue sleeve 51 from left to right;

9) screwing the adjusting screw 60 into the square hook strip threaded hole 14, and the adjusting screw 60 firmly fixing the brake pedal 50 sheathed with the glue sleeve 51 under the main bracket plate 10.

The technical solution of the present disclosure has the following beneficial effects:

The present disclosure is able to be used directly on a brake pedal of an original vehicle without the need to retrofit any components of the vehicle; the present disclosure adopts the left and right and upper and lower clamping manner for fixing, and the installation is more convenient and quick, and is more stable. The present disclosure is suitable for various different shapes of vehicle types, and brake pedals of different sizes are installed, and generally users is able to be installed on their own; the inventive components are small and suitable for industrial casting, and therefore have a wider adaptability, which is beneficial to promotion of applications of security devices.

The aforementioned embodiments of the present disclosure are for illustrating exemplary embodiments set forth in the present disclosure, and are not intended to limit the embodiments of the present disclosure. The obvious variation introduced by the prompt of the embodiments of the present disclosure is still within the scope of protection of the present disclosure.

What is claimed is:

1. A brake pedal sleeve with a throttle protection function and for facilitating installation of the throttle protection, comprising:

a main bracket plate (10), a supporting head (11), a square hook strip (13) and a main baffle plate (17) are provided on the main bracket plate (10); a supporting head through hole (12) is provided on the supporting head (11), a square hook strip threaded hole (14) is provided below the square hook strip (13), a main baffle plate threaded hole (19) is provided on the main baffle plate (17), and a main baffle plate tooth (18) is provided inside the main baffle plate (17); a small circular shaft sliding hole (15) and a large circular shaft sliding hole (16) are further provided in the main bracket plate (10), an auxiliary baffle plate (20), a small circular shaft (22) and a lame circular shaft (23) are provided on the auxiliary baffle plate (20), an auxiliary baffle plate tooth (21) is provided on an inner side of the auxiliary baffle plate (20), and an auxiliary baffle plate through hole (24) is provided on the auxiliary baffle plate (20);

a protection rod (30), a connecting rod (31), a limiting ring (32) and a limiting screw (36) are provided on the protection rod (30), and a circular head (34) is provided at one end of a protection rod supporting shaft (33), the protection rod supporting shaft (33) passes through a washer (37), a protection rod through hole (38), a supporting head through hole (12) and an inner hole of the spring ring (35), and the main bracket plate (10) and the protection rod (30) are combined together;

an anti-slip rubber pad (40), the anti-slip rubber pad (40) is provided on the main bracket plate (10);

a brake pedal (50);

an adjusting screw (60), a front end of the adjusting screw (60) is a tapered head (61), and under an absence of an external force, an elastic force of the spring ring (35) always flips the protection rod (30) to a right side of the brake pedal and makes the protection rod (30) opening in a horizontal state; the small circular shaft (22) and the large circular shaft (23) on the auxiliary baffle plate tooth (21) is able to be respectively inserted into the small circular shaft sliding hole (15) and the large circular shaft sliding hole (16); a long bolt (25) is able to be screwed into the main baffle plate threaded hole (19) through the auxiliary baffle plate through hole (24) for clamping the brake pedal (50), which is sheathed with a glue sleeve (51) from a left and right side of the brake pedal (50); the adjusting screw (60) is rotated into the square hook strip threaded hole (14) for fixing the brake pedal (50) sheathed with the glue sleeve (51) from below the brake pedal (50).

2. The brake pedal sleeve with the throttle protection function and for facilitating installation of the throttle protection as claimed in claim 1, wherein the small circular shaft (22) and the small circular shaft sliding hole (15) are clearance-fitted.

3. An installing method for a preventive throttle misstep device clamped on a brake pedal as claimed in claim 2, comprising the steps of:

1) exiting the adjusting screw (60) on the square hook strip (13) from the square hook strip threaded hole (14);
2) screwing out the long bolt (25) from the main baffle plate screw hole (19), and taking out the small circular shaft (22) and the large circular shaft (23) from the small circular shaft sliding hole (15) and the large circular shaft sliding hole (16) respectively;
3) gripping the main bracket plate (10) behind the brake pedal support rod (52), and placing the square hook strip (13) below the brake pedal (50) sheathed with the glue sleeve (51);
4) loading rear under part of the brake pedal (50) sheathed with the glue sleeve (51) into an inner groove of the square hook strip (13);
5) pressing a bottom surface of the main bracket plate (10) on a top surface of the glue sleeve (51), and loading the small circular shaft (22) and the large circular shaft (23) into the small circular shaft sliding hole (15) and the large circular shaft sliding hole (16) respectively;
6) passing the long bolt (25) through the auxiliary baffle plate through hole (24) and screwing into the main baffle plate screw hole (19), adjusting a position of the main board (10), so that the protection rod (30) is opened and parallel to a bottom edge of the brake pedal (50);
7) flipping the protection rod (30), confirming that the glue sleeve (51) on the brake pedal (50) does not block an opening and closing of the protection rod (30);
8) fastening the long bolt (25) through the auxiliary baffle plate through hole (24) and into the main baffle plate threaded hole (19), so that the main baffle plate tooth (18) on the main baffle plate (17) and the auxiliary baffle plate tooth (21) on the auxiliary baffle plate (20) firmly grip the brake pedal (50) sheathed with the glue sleeve (51) from the left to right sides of the brake pedal (50);
9) screwing the adjusting screw (60) into the square hook strip threaded hole (14), and the adjusting screw (60) firmly fixing the brake pedal (50) sheathed with the glue sleeve (51) under the main bracket plate (10).

4. The brake pedal sleeve with the throttle protection function for facilitating installation of the throttle protection as claimed in claim 1, wherein the large circular shaft (23) and the large circular shaft sliding hole (16) are clearance-fitted.

5. The brake pedal sleeve with the throttle protection function for facilitating installation of the throttle protection as claimed in claim 1, wherein the protection rod supporting shaft (33) and the washer (37) are clearance-fitted, the protection rod supporting shaft (33) and the protection rod through hole (38) are clearance-fitted, and the protection rod supporting shaft (33) and the supporting head through hole (12) are interference fit.

6. The brake pedal sleeve with the throttle protection function for facilitating installation of the throttle protection as claimed in claim 1, wherein a front end of the limiting screw (36) screws out of the protection rod (30), which can block the protection rod (30) from continuing to rotate upward or downward near the main bracket plate (10).

7. An installing method for a preventive throttle misstep device clamped on a brake pedal as claimed in claim 1, comprising the steps of:

1) exiting the adjusting screw (60) on the square hook strip (13) from the square hook strip threaded hole (14);
2) screwing out the long bolt (25) from the main baffle plate screw hole (19), and taking out the small circular shaft (22) and the large circular shaft (23) from the small circular shaft sliding hole (15) and the large circular shaft sliding hole (16) respectively;
3) gripping the main bracket plate (10) behind the brake pedal support rod (52), and placing the square hook strip (13) below the brake pedal (50) sheathed with the glue sleeve (51);

4) loading rear under part of the brake pedal (50) sheathed with the glue sleeve (51) into an inner groove of the square hook strip (13);
5) pressing a bottom surface of the main bracket plate (10) on a top surface of the glue sleeve (51), and loading the small circular shaft (22) and the large circular shaft (23) into the small circular shaft sliding hole (15) and the large circular shaft sliding hole (16) respectively;
6) passing the long bolt (25) through the auxiliary baffle plate through hole (24) and screwing into the main baffle plate screw hole (19), adjusting a position of the main board (10), so that the protection rod (30) is opened and parallel to a bottom edge of the brake pedal (50);
7) flipping the protection rod (30), confirming that the glue sleeve (51) on the brake pedal (50) does not block an opening and closing of the protection rod (30);
8) fastening the long bolt (25) through the auxiliary baffle plate through hole (24) and into the main baffle plate threaded hole (19), so that the main baffle plate tooth (18) on the main baffle plate (17) and the auxiliary baffle plate tooth (21) on the auxiliary baffle plate (20) firmly grip the brake pedal (50) sheathed with the glue sleeve (51) from the left to right sides of the brake pedal (50);
9) screwing the adjusting screw (60) into the square hook strip threaded hole (14), and the adjusting screw (60) firmly fixing the brake pedal (50) sheathed with the glue sleeve (51) under the main bracket plate (10).

\* \* \* \* \*